US009485551B2

(12) United States Patent
Prakash et al.

(10) Patent No.: US 9,485,551 B2
(45) Date of Patent: Nov. 1, 2016

(54) ENHANCED ROUTING AND WAVELENGTH ASSIGNMENT TECHNIQUES FOR REDUCING WAVELENGTH CONTINUITY BLOCKING

(71) Applicant: Ciena Corporation, Hanover, MD (US)

(72) Inventors: Anurag Prakash, Noida (IN); Mohit Chhillar, Delhi (IN)

(73) Assignee: Ciena Corporation, Hanover, MD (US)

( * ) Notice: Subject to any disclaimer, the term of this patent is extended or adjusted under 35 U.S.C. 154(b) by 202 days.

(21) Appl. No.: 14/073,623

(22) Filed: Nov. 6, 2013

(65) Prior Publication Data

US 2015/0086202 A1 Mar. 26, 2015

(30) Foreign Application Priority Data

Sep. 25, 2013 (IN) .......................... 2833/DEL/2013

(51) Int. Cl.

*H04J 14/00* (2006.01)
*H04J 14/02* (2006.01)
*H04Q 11/00* (2006.01)

(52) U.S. Cl.

CPC ......... *H04Q 11/0005* (2013.01); *H04J 14/021* (2013.01); *H04J 14/0257* (2013.01); *H04J 14/0267* (2013.01); *H04Q 2011/0086* (2013.01)

(58) Field of Classification Search

USPC .......................................................... 398/57
See application file for complete search history.

(56) References Cited

U.S. PATENT DOCUMENTS

| | | | | |
|---|---|---|---|---|
| 6,449,070 | B1 * | 9/2002 | Izumi | H04J 14/0221 359/337 |
| 7,286,760 | B1 * | 10/2007 | Lam | H04J 14/021 398/60 |
| 2002/0030864 | A1 * | 3/2002 | Chaudhuri | H04J 14/0227 398/5 |
| 2002/0191247 | A1 * | 12/2002 | Lu | H04B 10/03 398/79 |
| 2009/0296710 | A1 * | 12/2009 | Agrawal | H04L 45/04 370/392 |
| 2009/0296719 | A1 * | 12/2009 | Maier | H04L 45/12 370/400 |

OTHER PUBLICATIONS

Mokhtar et al., Adaptive Wavelength Routing in All-Optical Networks, 1998, IEEE, pp. 197-206.*
Kuppuswamy et al., An Analytic Approach to Efficiently Computing Call Blocking Probabilities for Multiclass WDM Networks, 2009, IEEE, pp. 658-670.*
Lu et al., Analysis of Blocking Probability for Distributed Lightpath Establishment in WDM Optical Networks, 2005, IEEE, pp. 187-197.*

(Continued)

*Primary Examiner* — Ken N Vanderpuye
*Assistant Examiner* — Jai Lee
(74) *Attorney, Agent, or Firm* — Clements Bernard PLLC; Christopher L. Bernard; Lawrence A. Baratta, Jr.

(57) ABSTRACT

Embodiments of the disclosure are directed to optimizing routing and wavelength assignment in a network. An embodiment determines a routing assignment for a network, wherein the routing assignment is determined using a decongestion cost-based function; and determines a wavelength assignment for the network based on vector difference. The determination of the wavelength assignment comprises spanning the network for a path; calculating a weighted correlation function for at least one length in the network; storing the weighted correlation; and determining if a next path exists. If a next path is found, spanning for a next path in the network, and if a next path is not found, returning the stored correlation.

29 Claims, 13 Drawing Sheets

300
302 Determine routing assignment for a network
304 Determine wavelength assignment
306 Span network for path
308 Calculate weighted correlation function
310 Store weighted correlation
312 Is next path found?
Yes
314 Span for next path
No
316 Return stored weighted correlation 700
[1000] 710 $b_{ijm}$ [0111] [1000] 712 x 4 [4000]
[1001] 708 $b_{ijm}$ [0110] [1001] 712 x 3 [3003]
[1101] 706 $b_{ijm}$ [1001] [0110] 712 x 2 [2002]
[1111] 704 $b_{ijm}$ [1001] [0110] 712 x 1 [1001]
[1001] 714 $w_{sdm}$
Σ
702 $vd_{ijm}$ [10, 0, 0, 6]

(56) References Cited

OTHER PUBLICATIONS

Zhu et al., A Path Decomposition Approach for Computing Blocking Probabilities in Wavelength-Routing Networks, 2000, IEEE, pp. 747-762.*

Chu et al., Dynamic Routing and Wavelength Assignment in the Presence of Wavelength Conversion for All-Optical Network, 2005, IEEE, pp. 704-715.*

Prakash et al., Enhanced Wavelength Routing and Assignment schemes in DWDM networks to reduce blocking due to wavelength continuity, May 15, 2013.*

Prakash et al., "Enhanced Wavelength Routing and Assignment schemes in DWDM networks to reduce blocking due to wavelength continuity," White Paper. May 15, 2013. p. 1-22.

Zhu et al., "A Path Decomposition Approach for Computing Blocking Probabilities in Wavelength-Routing Networks," IEEE/ACM Transactions on Networking, vol. 8, No. 6, Dec. 2000. p. 747-762.

Mokhtar et al., "Adaptive Wavelength Routing in All-Optical Networks," IEEE/ACM Transactions on Networking, vol. 6, No. 2, Apr. 1998. p. 197-206.

Kuppuswamy et al., "An Analytic Approach to Efficiently Computing Call Blocking Probabilities for Multiclass WDM Networks," IEEE/ACM Transactions on Networking, vol. 17, No. 2, Apr. 2009. p. 658-670.

Lu et al., "Analysis of Blocking Probability for Distributed Lightpath Establishment in WDM Optical Networks," IEEE/ACM Transactions on Networking, vol. 13, No. 1, Feb. 2005. p. 187-197.

Sridharan et al., "Blocking in All-Optical Networks," IEEE/ACM Transactions on Networking, vol. 12, No. 2, Apr. 2004. p. 384-397.

Chu et al., "Dynamic Routing and Wavelength Assignment in the Presence of Wavelength Conversion for All-Optical Networks." IEEE/ACM Transactions on Networking, vol. 13, No. 3, Jun. 2005. p. 704-715.

* cited by examiner

ENHANCED ROUTING AND WAVELENGTH ASSIGNMENT TECHNIQUES FOR REDUCING WAVELENGTH CONTINUITY BLOCKING

BACKGROUND OF THE INVENTION

1. Field of the Invention

Embodiments of the disclosure are directed to optimizing routing and wavelength assignment in network.

2. Description of the Related Art

Photonic transport solutions support various configurations like Optical amplifiers, Regenerators, Reconfigurable Optical Add-Drop Multiplexers (ROADMs), and switches. These are used for various applications like wavelength switching, conversion and reuse. Wavelength division multiplexing (WDM) technologies can provide the increase in network capacity to meet the growing traffic demands in optical networks. In a WDM network, the fiber bandwidth is divided into multiple frequency bands called wavelengths. Using ROADMs at network nodes, some of these wavelengths can be selected at each node for termination and electronic processing and others for optical bypass. In all optical network architectures, each traffic session optically bypasses electronic processing at each node on its path other than the source node and the destination node.

Routing and wavelength assignment refers to determining a route and wavelength for all the client requests. The same wavelength cannot be assigned to multiple light paths. If no wavelength conversion is possible, then a light path must be assigned the same wavelength on all links in its route. Without optical wavelength conversion, routing traffic sessions are subjected to wavelength continuity constraint. Wavelength continuity constraint dictates that the light path corresponding to a given session must travel on the same wavelength on all links from source to destination node.

SUMMARY

Systems and methods according to various exemplary embodiments can include features and benefits such as, but not limited to, using continuity checks to reduce wavelength continuity blocking probability.

According to one embodiment, a method for optimizing routing and wavelength assignment in a network can comprise: determining a routing assignment for a network, wherein the routing assignment is determined using a decongestion cost-based function; and determining a wavelength assignment for the network based on vector difference. The determination of the wavelength assignment can comprise: spanning the network for a path; calculating a weighted correlation function for at least one length in the network; storing the weighted correlation; and determining if a next path exists. If a next path is found, spanning for a next path in the network, and if a next path is not found, returning the stored correlation.

According to one embodiment, an apparatus for optimizing routing and wavelength assignment in a network can comprise: logic for determining a routing assignment for a network, wherein the routing assignment is determined using a decongestion cost-based function; and logic for determining a wavelength assignment for the network based on vector difference. The determination of the wavelength assignment can comprise: logic for spanning the network for a path; logic for calculating a weighted correlation function for at least one length in the network; logic for storing the weighted correlation; and logic for determining if a next path exists; logic for spanning for a next path in the network if a next path is found, and logic for returning the stored correlation if a next path is not found.

According to one embodiment, an apparatus for optimizing routing and wavelength assignment in a network can comprise: means for determining a routing assignment for a network, wherein the routing assignment is determined using a decongestion cost-based function; and means for determining a wavelength assignment for the network based on vector difference. The determination of the wavelength assignment can comprise: means for spanning the network for a path; means for calculating a weighted correlation function for at least one length in the network; means for storing the weighted correlation; and means for determining if a next path exists; means for spanning for a next path in the network if a next path is found, and means for returning the stored correlation if a next path is not found.

According to one embodiment, a computer-readable storage medium for optimizing routing and wavelength assignment in a network can comprise: at least one instruction to determine a routing assignment for a network, wherein the routing assignment is determined using a decongestion cost-based function; and at least one instruction to determine a wavelength assignment for the network based on vector difference. The determination of the wavelength assignment can comprise: at least one instruction to span the network for a path; at least one instruction to calculate a weighted correlation function for at least one length in the network; at least one instruction to store the weighted correlation; and at least one instruction to determine if a next path exists; at least one instruction to span for a next path in the network if a next path is found, and at least one instruction to return the stored correlation if a next path is not found.

Other aspects and advantages associated with the embodiments disclosed herein will become apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Data communication networks may include various computers, servers, nodes, routers, switches, bridges, hubs, proxies, and other network devices coupled to and configured to pass data to one another. These devices are referred to herein as "network elements" or "network devices." Data is communicated through the data communication network by passing protocol data units, such as Internet Protocol (IP) packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

A "dark section" is a section wherein all the amplifier blocks in the section remain in shutoff state due to loss of light (i.e., that no traffic carrying channels or wavelengths are present in the system).

Figure 1:
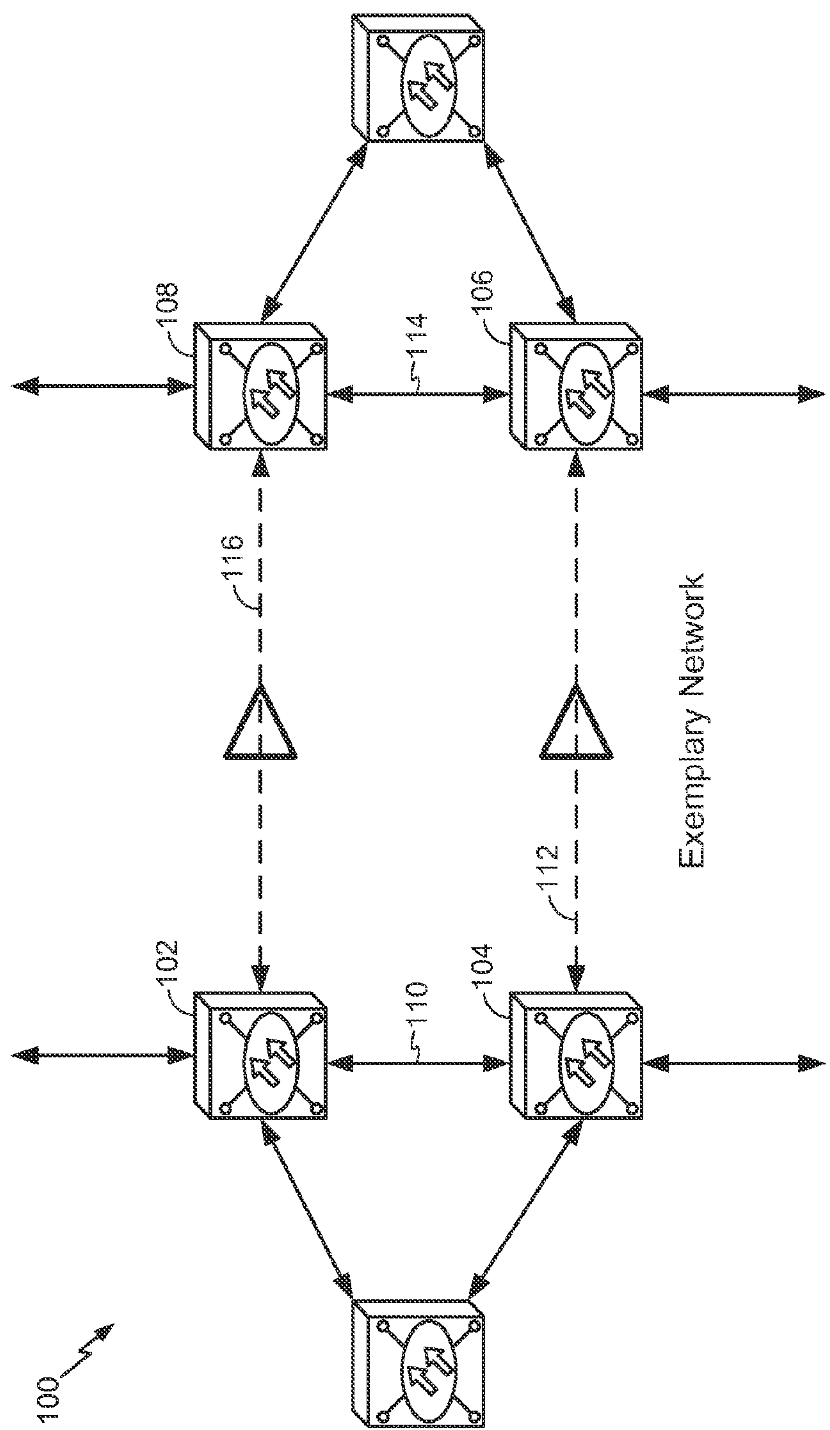
FIG. 1 illustrates an exemplary Reconfigurable Optical Add-Drop Multiplexer (ROADM) configuration, which is known in the art.

FIG. 1 illustrates an exemplary Reconfigurable Optical Add-Drop Multiplexer (ROADM) configuration 100, which is known in the art. ROADMs 102, 104, 106, and 108 are all part of the same network. The links 110, 112, 114, and 116 have various wavelength frequencies on which they can communicate. For example, links 112 and 114 have the same frequency. Therefore, ROADM 104 can transmit to ROADM 108 using one wavelength frequency. However, ROADM 102 cannot communicate with ROADM 106 through ROADM 104 without, for example, a Regenerator. This limitation exists because link 110 and link 112 are different frequencies, and thus, wavelength continuity constraints occur within the network.

Figure 2:
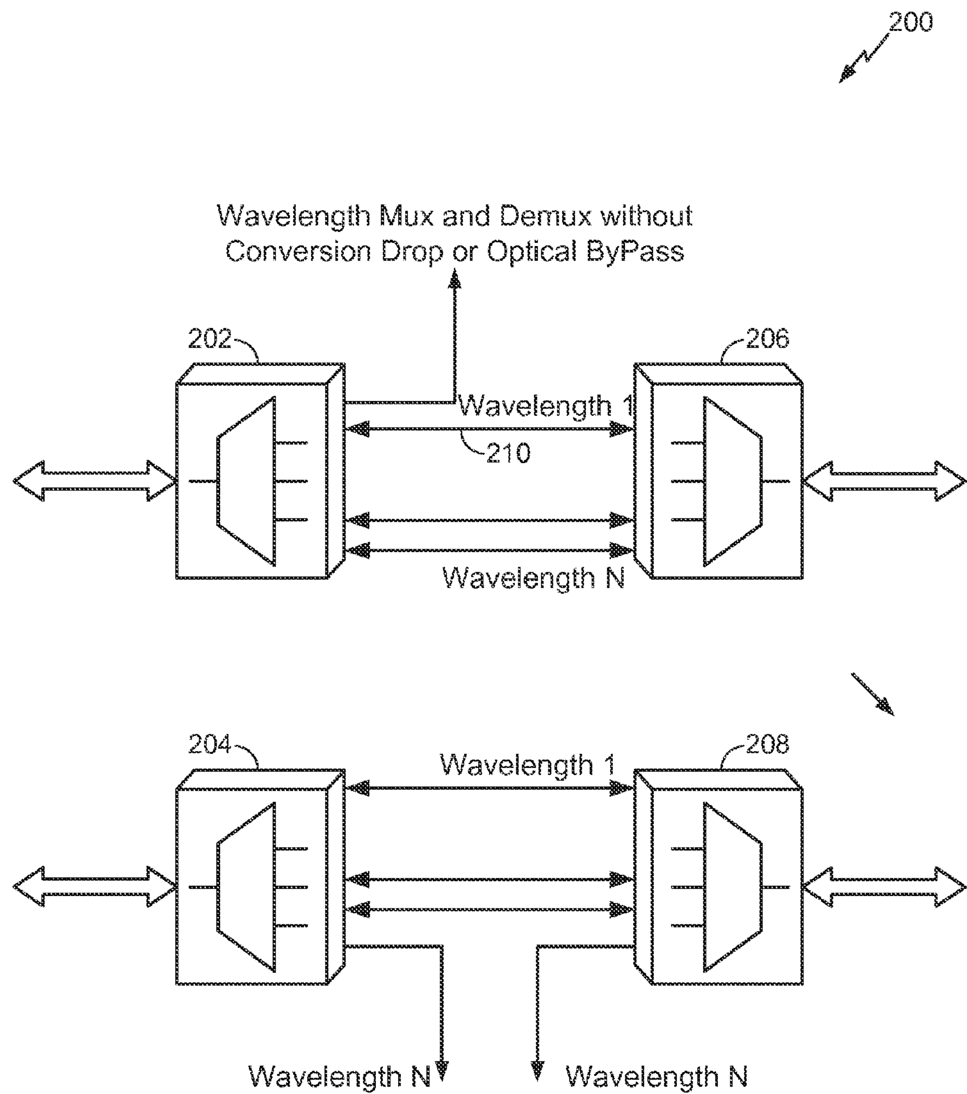
FIG. 2 illustrates exemplary intra-node partial connectivity.

FIG. 2 illustrates exemplary intra-node partial connectivity. Within a node 200, there are multiplexers 202, 204 and demultiplexers 206, 208. These are coupled to communicate within the node. As shown, the intra-node communication is not a fully connected mesh. For example, a path 210 can exist from multiplexer 202 to demultiplexer 206, but not from multiplexer 204 to demultiplexer 206. This partial connectivity can be considered a constraint on an optical network.

Figure 3:
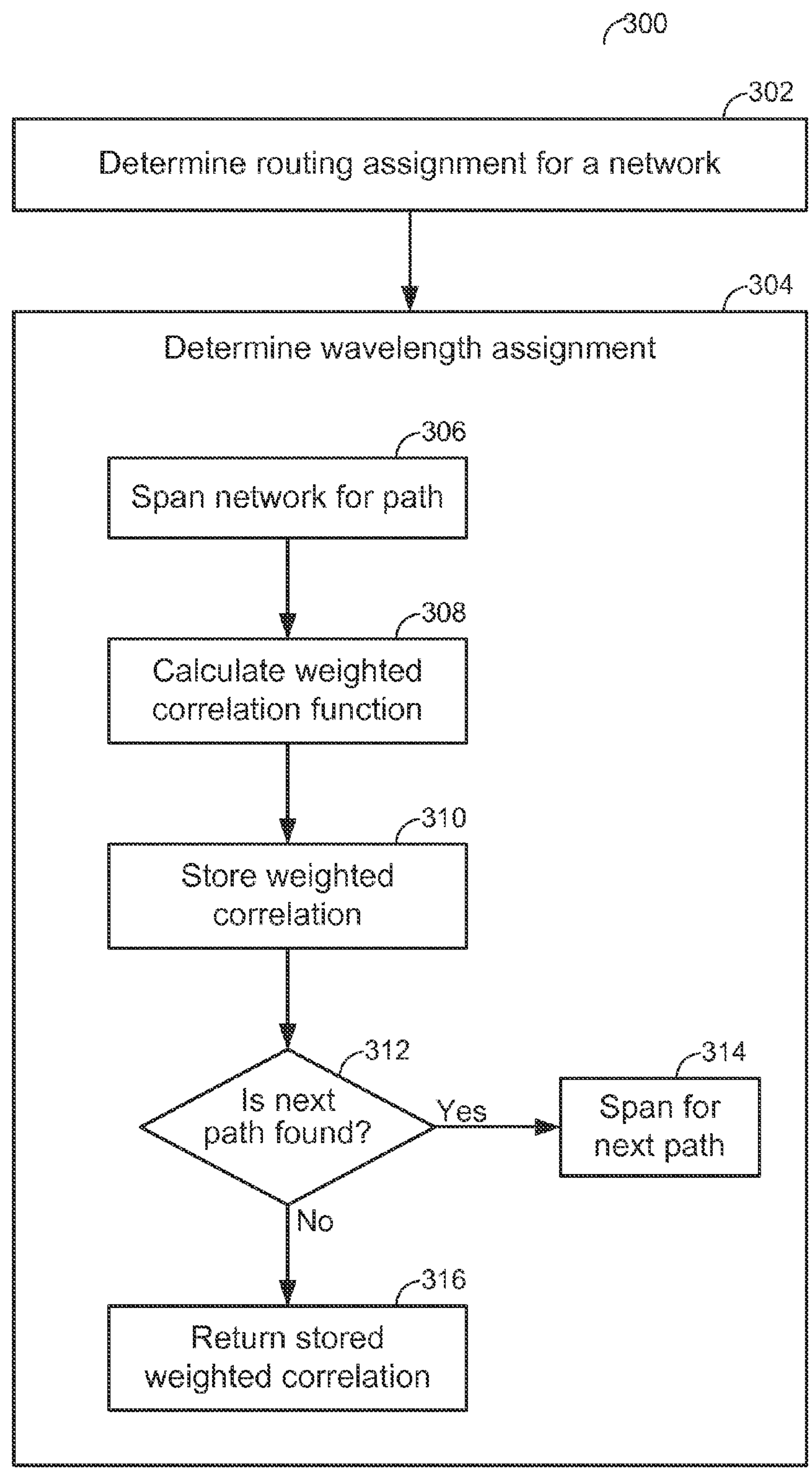
FIG. 3 illustrates an exemplary flow for optimizing routing and wavelength assignment in network.

FIG. 3 illustrates an exemplary flow for optimizing routing and wavelength assignment in a network 300. The network can comprise a heterogeneous bandwidth composition.

At 302, a routing assignment is determined for a network using a cost-based function. Some embodiments can include a Dijkstra-based shortest path first (SPF) algorithm with extensions to K-SPF; congestion cost based algorithms; genetic algorithms; prediction algorithms; and ILP-based algorithms. Embodiments of the cost based algorithm are further described in FIGS. 4A and B.

At 304, a wavelength assignment is determined for the network based on vector difference. The wavelength assignment is a selection and reservation of a wavelength from a choice of a set of wavelengths returned by the routing algorithm. The wavelength assignment determination can include the following actions.

At 306, the network can be spanned for a path.

At 308, a weighted correlation function can be calculated for at least one length in the network. A vector difference correlates a wavelength vector with all other link within a node, which can be reached from any of the nodes in the lightpath reservation path adhering to wavelength continuity constraint. As the number of these wavelength vectors in a single correlation increases, the weightage for the same can also increase. In some embodiments, a particular wavelength usage in the network can be directly proportional to the blocking probability for that wavelength in the network. In some embodiments the vector difference can be calculated over all the links or MST (minimum spanning tree) of the network without wavelength continuity constraints.

$$vd_{sdm} = \sum_{i=1}^{V} \sum_{k>=j}^{E_i} a_k \{w'_{s,d,m} \oplus b_{i,j,m} \oplus b_{i,k,m} \ \ldots \ \}$$

$$vd_{sdm} = \sum_{i=1}^{V} a_k \{w'_{s,d,m} \oplus b_{i,j,m} \oplus b_{i,k,m} \ \ldots \ \}$$

-continued $$\text{where } w'_{s,d,m} = \overline{\{w_{s,d,m} \cdot b_{i,j,m} \ \dots \ \}}$$

$$\text{where } a_k < a_{k+1}$$

$$\lambda_{select,m} = \min\{vd\lambda_1, vd\lambda_2 \ \dots \ , vd\lambda_m\}$$

At 310, the calculated weighted correlation is stored. At 312, it is determined whether a next path is found. If a next path is found, the flow continues to 314. At 314, the next path is spanned. If a next path is not found, the flow continues to 316. At 316, the stored weighted correlation is returned.

In some instances, more than one wavelength can be specified. In some embodiments, a vector difference can be calculated to reduce computational complexity. For example, the vector difference can be calculated for MST links. MST can be recalculated if an MST link drops to zero available bandwidth. In some embodiments, a vector difference can be calculated for all network links. For example, the vector difference can be calculated for all network links in a network larger than 30 nodes. In some embodiments, links within two-level proximity can be calculated for a current working path.

Figure 4A:
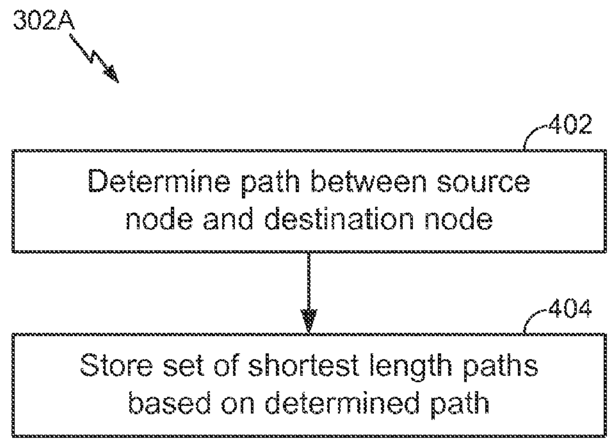
FIG. 4A illustrates an exemplary flow of a routing assignment.

FIG. 4A illustrates an exemplary flow of a routing assignment 302A using a K-SPF algorithm. At 402, at least one path is determined between the source node and the destination node. In some embodiments, the length of the path is determined as the number of links required to be traversed to travel on the path from the source node to the destination node.

At 404, a set of shortest length paths between the source node and the destination node is stored. The set can be one path or more than one path. In some embodiments, a wavelength continuity constraint can be applied to create a wavelength availability vector. The diversification of routes can reduce a probability of blocking within the network because there is more than one shorter path to be taken.

$$P_{s,d}=(p_{1,s,d}p_{2,s,d} \ldots p_{k,s,d})$$

$$p_{s,d}=(e_{s,i}e_{i,j} \ldots e_{n,d})$$

$$w_{s,d,m}=(b_{s,i,m} \cdot b_{i,j,m} \cdot \ldots \cdot b_{n,d,m})$$

In some embodiments, the constraint can be applied such that a path with more hops may be included to increase the number of available paths in the network. For example, amongst the set of paths, shortest path may include highly congested links with higher utilization and other relatively longer paths with links which are underutilized. Hence using a slightly longer path can reduce congestion and increases the number of available routes in the network without noticeably increasing inefficiency.

To assist in calculating connectivity, each node can be calculated as not being connected to itself. In some embodiments, the intra connectivity within the node can be represented as an N×N matrix representation where each degree uni-directional connectivity is represented.

Figure 4B:
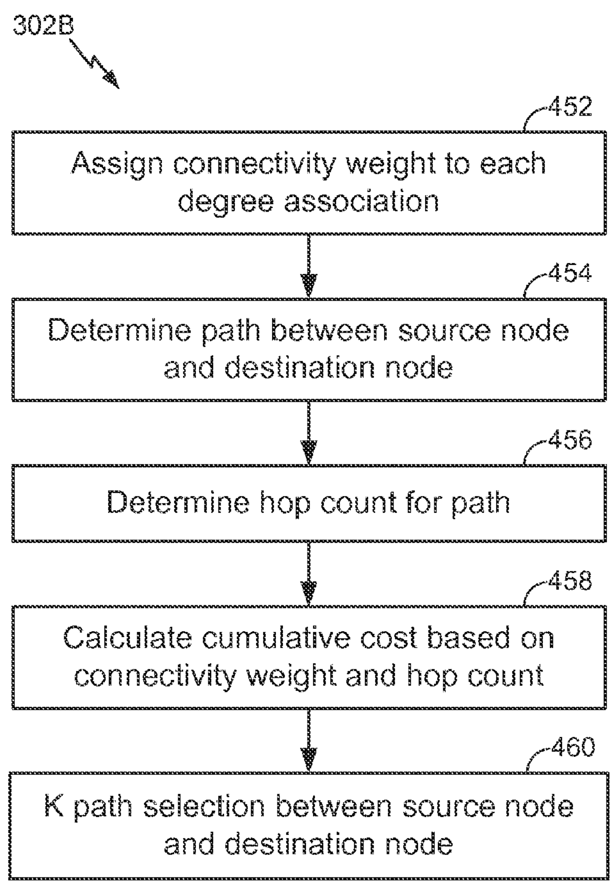
FIG. 4B illustrates another exemplary flow of a routing assignment.

FIG. 4B illustrates another exemplary flow of a routing assignment 302B using a decongestion algorithm.

At 452, a connectivity weight is assigned to each cross connect within the source node. A connectivity weight is a normalized weightage, in terms of wavelengths, to an optical cross connect for the association between two degrees within a node. The connectivity weight is associated with the set of two links and the three nodes for those two links. Thus, degree association can be preserved in the parameter. The connectivity weight can represent the connectivity strain for the optical cross connect in the network. In some embodiments, the strain tensor can be represented as a matrix for a node. In some embodiments, a matrix can also be generated for a particular wavelength. The congestion factor in the following equations signifies the weight given to the connectivity matrix during route computation. An exemplary weighting assignment is as follows:

$$CW_r = \begin{pmatrix} cw_{1,1,m} & cw_{1,2,m} & \cdots & cw_{1,n,m} \\ cw_{2,1,m} & cw_{2,2,m} & \cdots & cw_{n,n,m} \\ \vdots & & \vdots & \\ cw_{n,1,m} & cw_{n,2,m} & \cdots & cw_{n,n,m} \end{pmatrix} \quad (13)\ (14)$$

$$cw_{i,j,m} = \frac{x_{cg} * \lambda_{max} * (c_r + c_i + c_j)}{\sum_{r}^{V_r:\, r \in neighbors, currentnode} c_r} \text{ for } i \neq j \quad (15)$$

$$cw_{i,j,m} = \frac{x_{cg} * \lambda_{max} * (c_r)}{\sum_{r}^{V_r:\, r \in neighbors, currentnode} c_r} \text{ for } i = j \quad (16)$$

where $c_r$ is the connectivity count for Node $v_r$
and $c_i$ is the degree count for Node $v_{r+1}$ on degree $i$
and $c_j$ is the degree count for Node $v_{r-1}$ on degree $j$
and $\lambda_{max}$ is the maximum wavelengths allowed on $e_{ij}$
and $x_{cg}$ is Congestion Factor.

The example above is based on assigning weights to every possible cross connect within a node and thus implicitly applies to partial connectivity. The weights can be assigned to degree to degree association within a node.

At 454, at least one path is determined between the source node and the destination node.

At 456, a hop count is determined for the at least one path. For example, a hop count can be taken by a path $p_{s;i}$, till node $v_i$ from node $v_s$. The cumulative or incremental cost can be defined as:

$$cost_{s,i}=cost_{s,i-1}=cw_{i,j,m} \cdot (\text{current hop count}) \quad (17)$$

$$p_{s,d,selected}=\min(cost_{s,i}) \quad (18)$$

At 458, a cost is calculated based on the connectivity weight and the hop count.

At 460, K paths are selected based on the cumulative cost calculated to be considered for wavelength assignment. In some embodiments, the preferred path will be the path with the lowest connectivity weight and the lowest hop count. When this example is not available, a determination between a path with a higher connectivity weight and a lower hop count or a lower connectivity weight and a higher hop count may be necessary.

Figure 5:
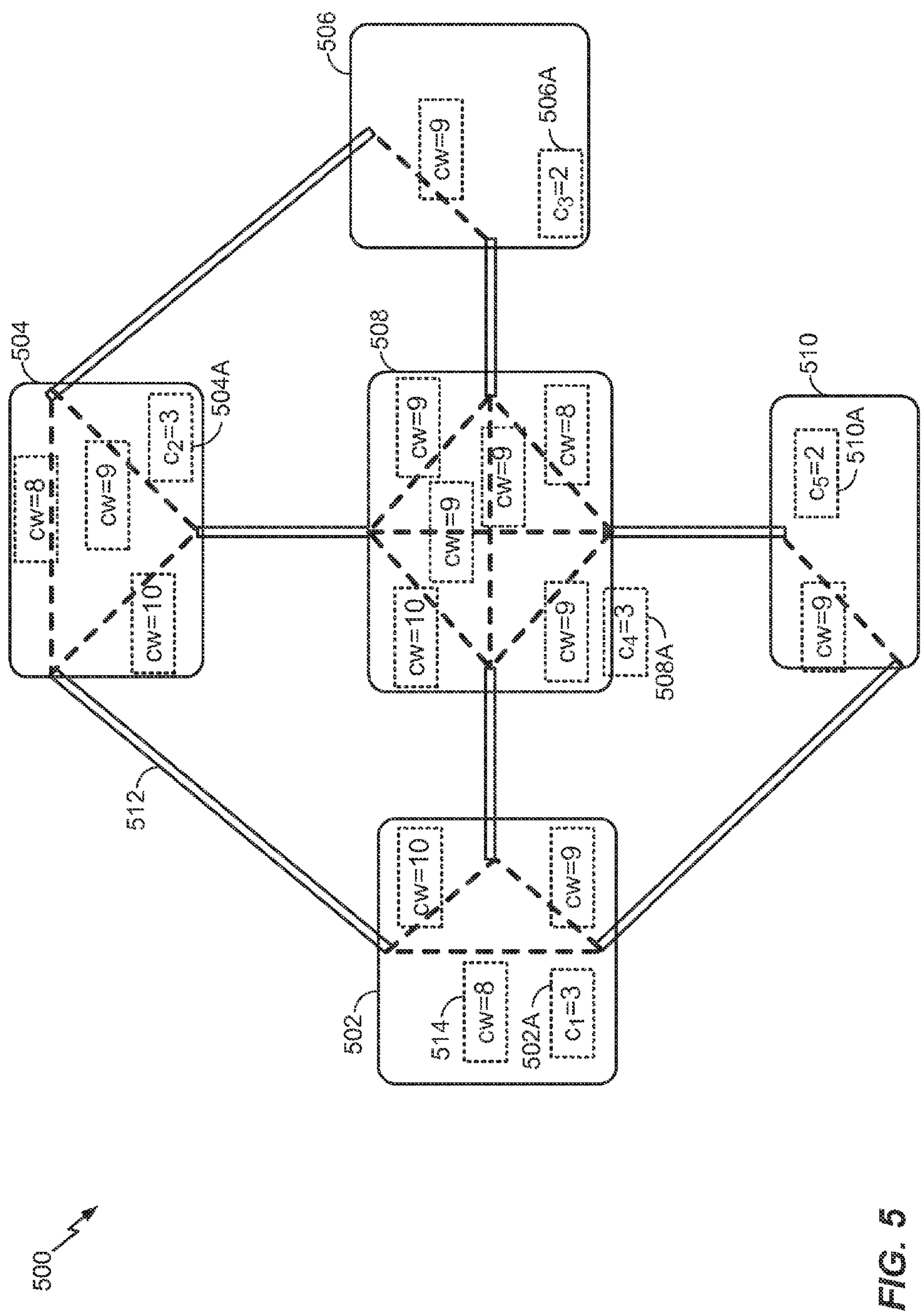
FIG. 5 illustrates exemplary inter-node connectivity weights.

FIG. 5 illustrates exemplary inter-node connectivity weights. ROADM nodes 502, 504, 506, 508, 510 are connected in a network 500. As shown in FIG. 5, ROADM nodes 502 and 504 are connected through a link 512. A connectivity count 502A, 504A, 506A, 508A, 510A can be described as the number of cross connections. A connectivity weight 514, on the other hand, can be described as the degree of cross connections. For example, the degree of cross-connections between ROADM nodes 502, 504 is 8.

Figure 6:
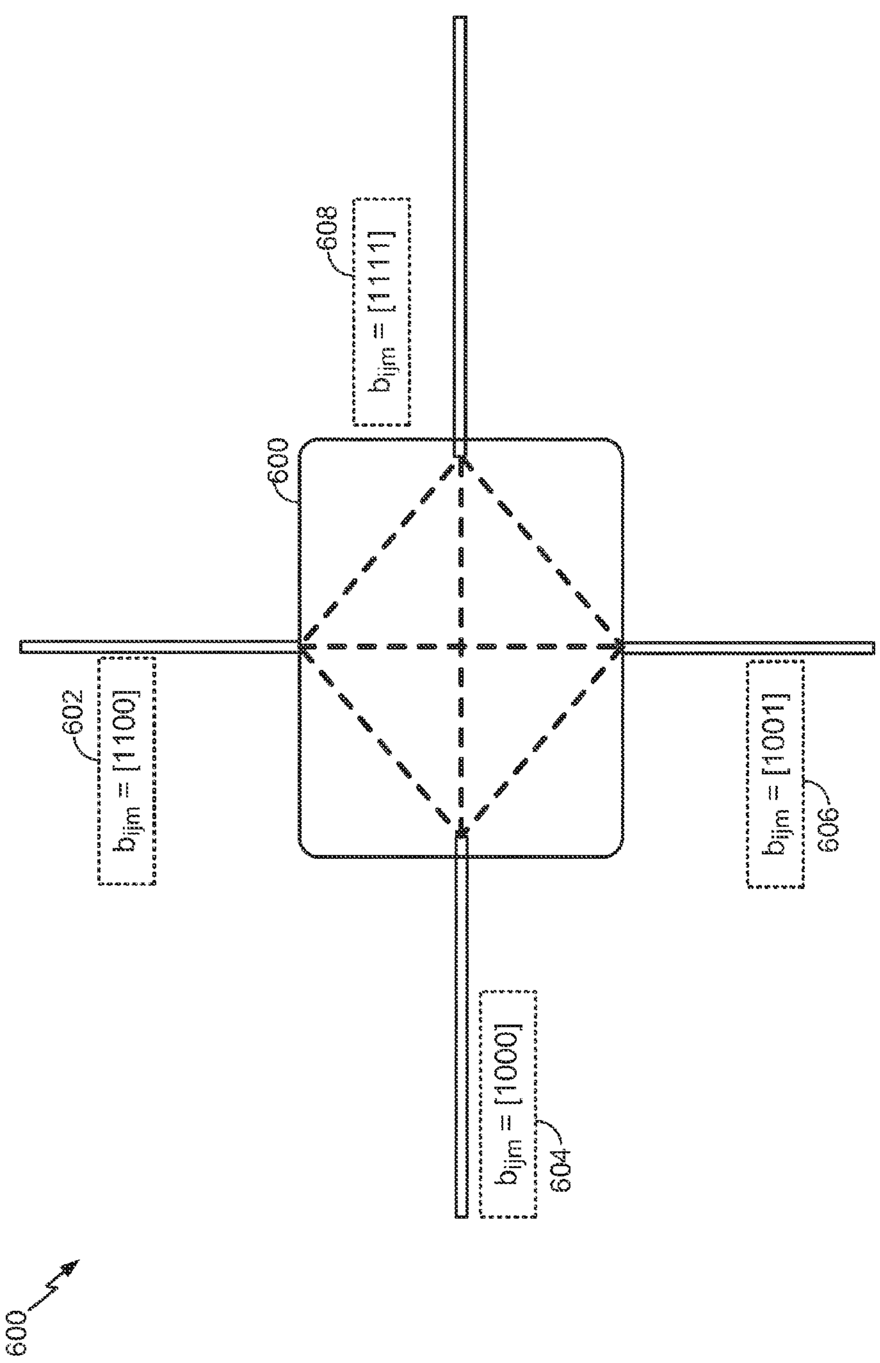
FIG. 6 illustrates exemplary wavelength continuity blocking.

FIG. 6 illustrates exemplary wavelength continuity blocking. In FIG. 6, there are four links to ROADM 600. Available paths are provided by matrices as shown for each link, 602, 604, 606, 608. As shown, wavelength 1 is available to all four links. If two of the links use wavelength 1, the other two paths are blocked, as is wavelength continuity. Using the fourth wavelength to communicate between link 602 and 608, however, means that all other wavelengths are available.

In some instances, vector difference can be calculated. Vector difference can correlate a wavelength vector with all other links within a node. The node can be reached from any node in a lightpath reservation path. As vectors in a single correlation for the node increase, the weightage $a_k$ for the difference can also increase. The cumulative vector difference can be expressed as either of the following equations:

$$vd_{sdm} = \sum_{i=1}^{V}\sum_{k>=j}^{E_i} a_k\{w'_{s,d,m} \oplus b_{i,j,m} \oplus b_{i,k,m} \ \dots \ \} \tag{20}$$

$$vd_{sdm} = \sum_{i=1}^{V} a_k\{w'_{s,d,m} \oplus b_{i,j,m} \oplus b_{i,k,m} \ \dots \ \} \tag{21}$$

where $w'_{s,d,m} = \overline{\{w_{s,d,m} \cdot b_{i,j,m} \ \dots \ \}}$ where $a_k < a_{k+1}$ $$\lambda_{select,m} = \min\{vd\lambda_1, vd\lambda_2 \ \dots \ , vd\lambda_m\} \tag{22}$$

An exemplary algorithm for vector difference with continuity constraints can be:

```
%%start at the source node
V ← V_s
while V ≠ ∅ do
  V_i ←V_i ∈ V
  V ← V −V_i
  for all e_ij in V_i do
    %% Skip if λ continuity is not met
    If {e_ijm & w_sdm} ≠ 0 then
      If V_j notvisited then
        V ← V + V_j
      end if
      λ_vector,i ← w_sdm & e_ijm
      for all e_ik in V_i : a_i + +: i ≠ k do
        %%calculate vector difference for all lambdas
        vd_ijm ← vector_difference(b_ijm,λ_vector,i,a_i+
        +)
        λ_vector,i ← λ_vector,i & b_ijm
      end for
    end if
    V_i ← visited
  end for
end while
```

A second exemplary algorithm for vector difference with continuity constraints can be:

```
%%start at the source node
V ←V_s
while V ≠ ∅ do
  V_i ← V_i ∈ V
  V ← V − V_i
  λ_vector,i ← w_sdm
  for all e_ij in V_i : a_i ++ do
    %%calculate difference for all lambdas
    vd_ijm ← vector_difference(b_ijm, λ_vector,i a_i)
    λ_vector,i ← λ_vector,j & b_ijm
    %% Skip if λ continuity is not met
    If vd_ijm ≠ 0 then
      If V_jnotvisited then
        V ← V + V_j
      end if
    end if
    V_i ← visited
  end for
end while
```

Figure 7:
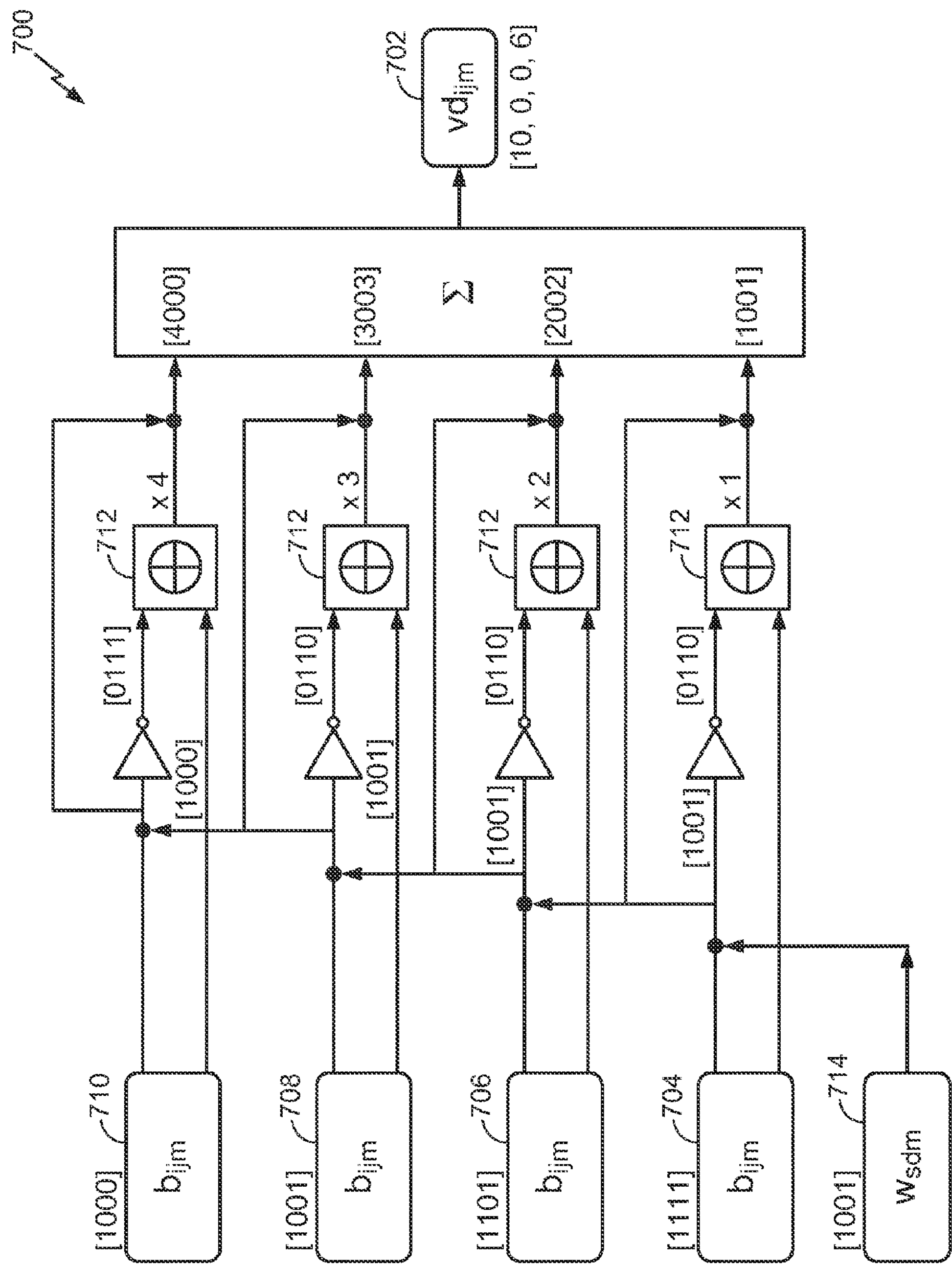
FIG. 7 illustrates an exemplary vector difference with continuity evaluation tree.

An evaluation logic tree 700 in FIG. 7 can be evaluated for every link as shown in equation 20. In equation 21, the evaluation logic tree 700 can be evaluated once. In order to reduce computational time, $vd_{sdm}$ 702 can be calculated with a limited set of links 704, 706, 708, 710. For example, MST can be used for large networks. Links within two hop reach of the lightpath reservation route for small networks can be used. A vector difference calculation can be provided in the evaluation tree. The weightage $a_k$ 712 assigned to the vector difference can be increased with the size of the set of links $\{b_{i,j,m}\}$ 704, 706, 708, 710 for evaluating $vd_{sdm}$. This evaluation can provide a difference 702 for the first wavelength in $w_{sdm}$ 714 as 10 whereas the difference 702 for the fourth wavelength in $w_{sdm}$ 714 can be 6. Thus, the first wavelength is desired and can be discouraged.

Figure 8:
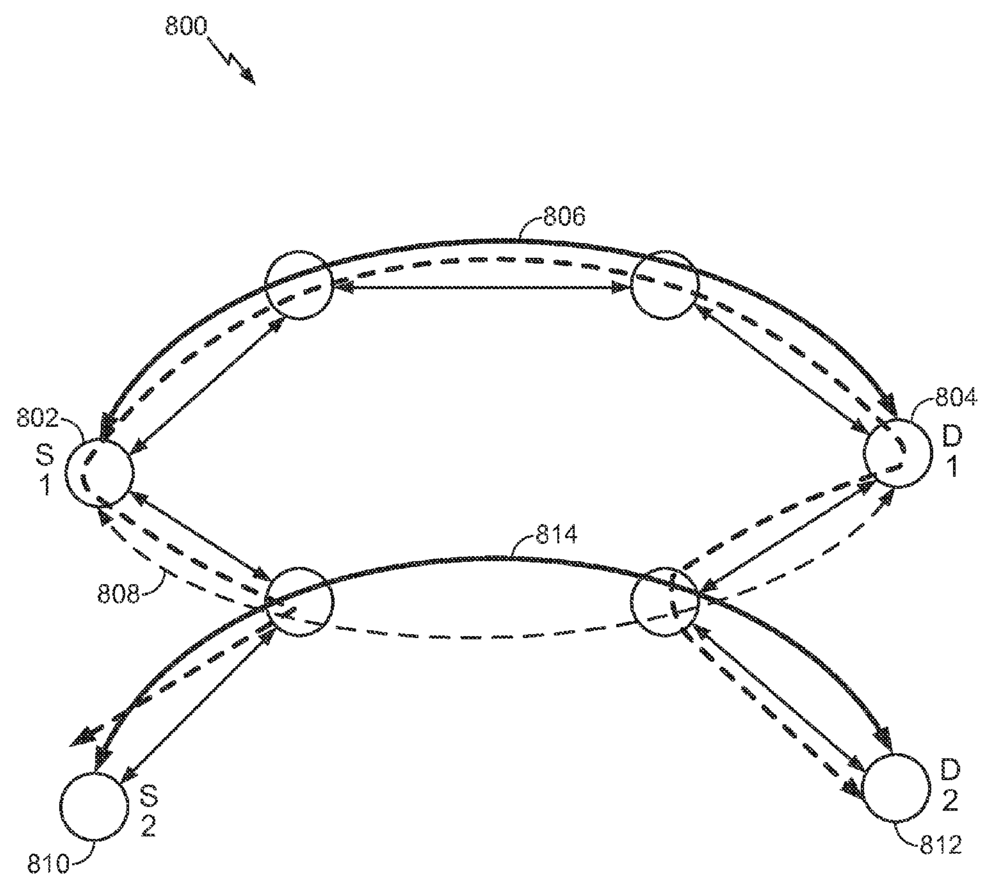
FIG. 8 illustrates exemplary choices of path and wavelength for non-blocking.

FIG. 8 illustrates exemplary choices of path and wavelength for non-blocking. In a network 800 that has more than one path for a first source node 802 to a first destination node 804, one path 806 may have more connectivity than a second path 808. As shown here, both paths 806, 808 have the same number of hops. However, the second path 808 can also provide connectivity for source node 810 and destination node 812 through a third path 814. If both the second path 808 and the third path 814 are to be used, this can cause blocking issues. If the first path is weighted so that it is considered preferred, however, this can cause fewer blocking issues.

Figure 9:
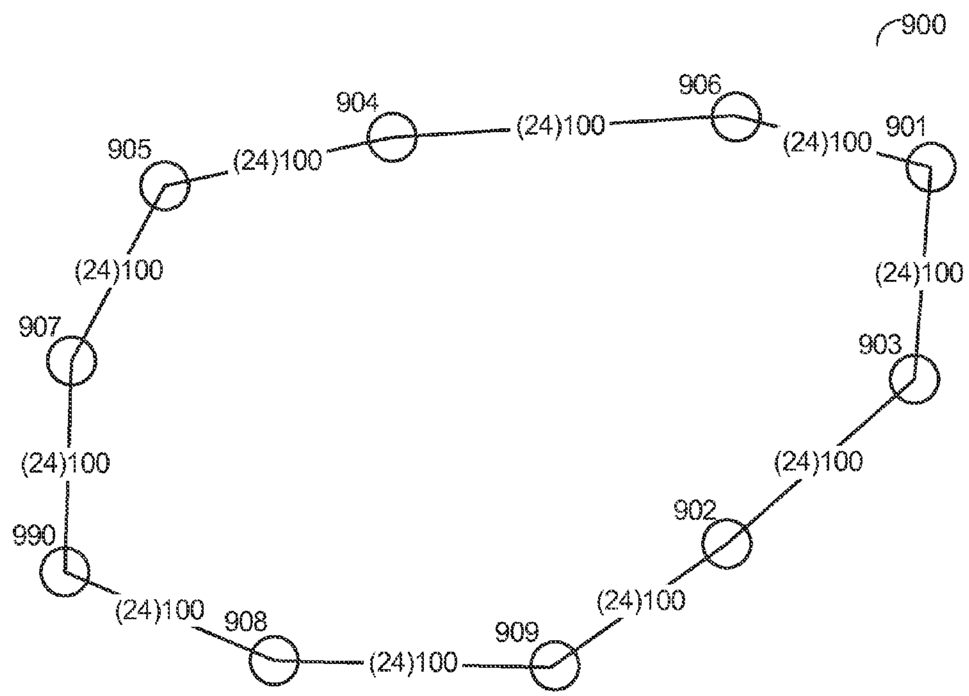
FIG. 9 illustrates an exemplary ring network.

FIG. 9 illustrates an exemplary ring network 900 with nodes 900-910. The connectivity count and connectivity weight are shown as (c)cw. In a ring network, a cost based algorithm should not have an impact because there is only one path through the ring. The wavelength assignment, however, can still be optimized.

Figure 10:
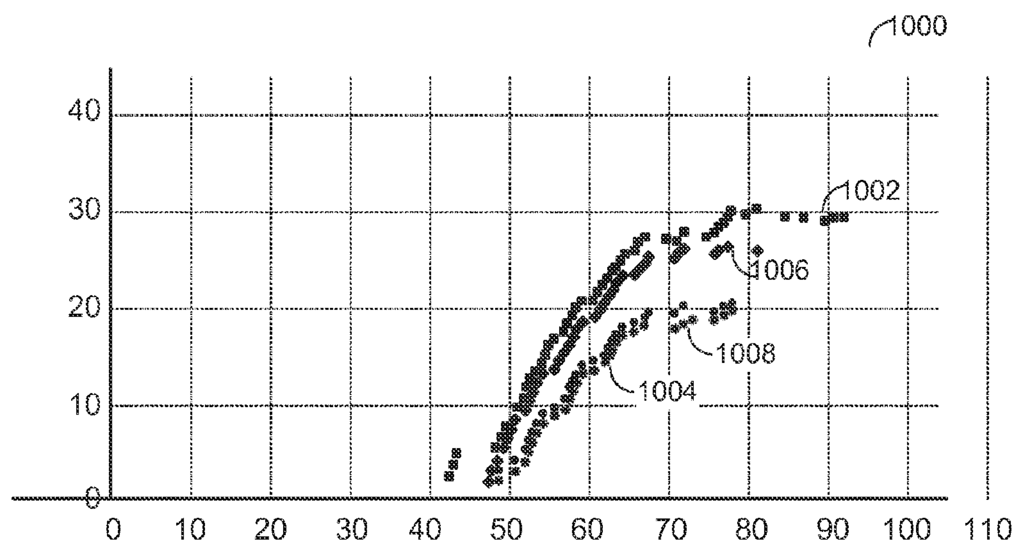
FIG. 10 illustrates an exemplary graph of blocking probability curves for wavelength continuity in a ring network.

FIG. 10 illustrates an exemplary realtime graph 1000 of blocking probability curves for wavelength continuity in a ring network. The data is as follows: Connectivity Weighted No Vector Difference 1002; Connectivity Weighted with Vector Difference Network 1004; Connectivity Weighted with Vector Difference MST Continuity 1006; and Connectivity Weighted with Vector Difference Network Continuity 1008

Figure 11:
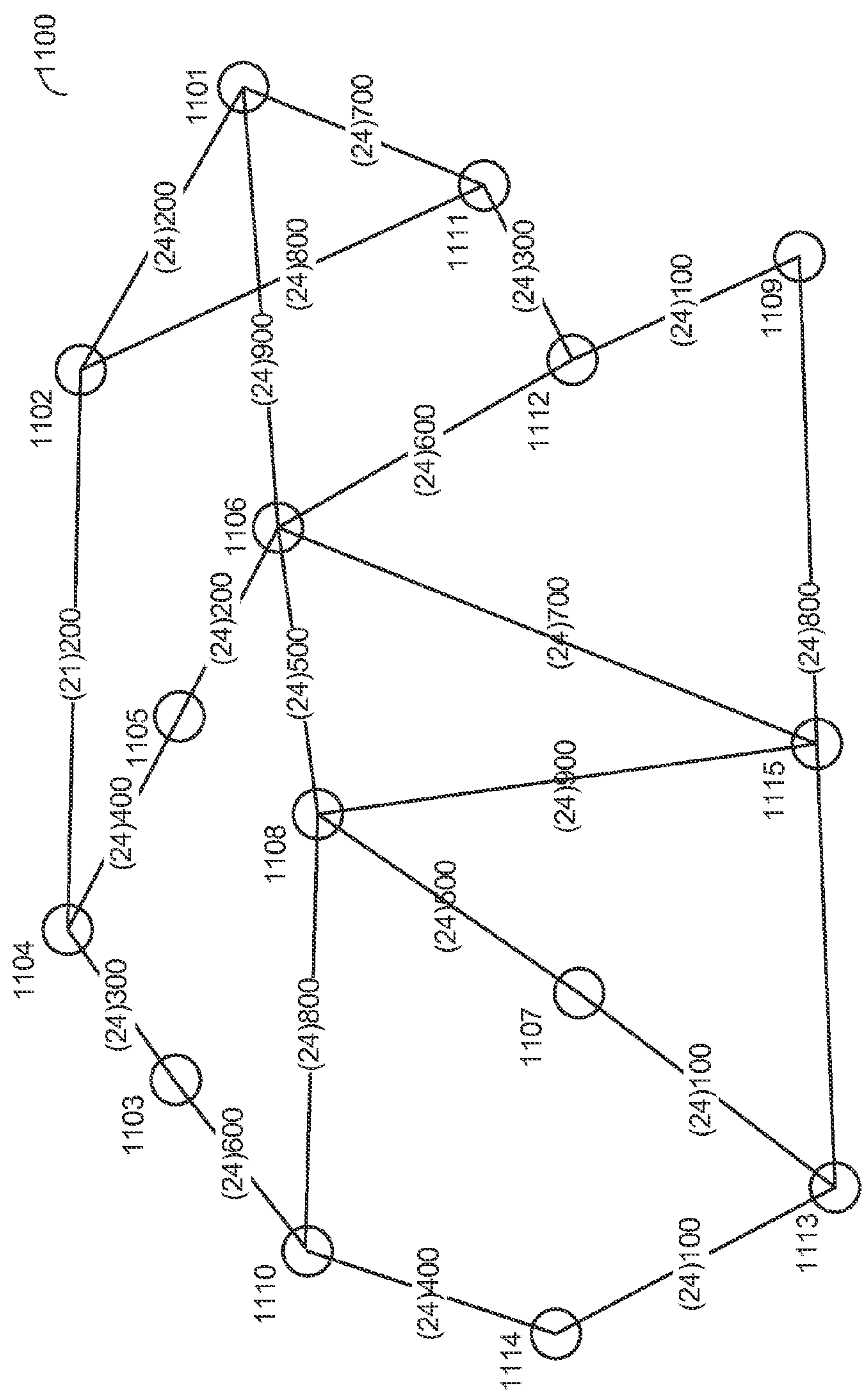
FIG. 11 illustrates an exemplary node metro network.

FIG. 11 illustrates an exemplary node metro network 1100 with nodes 1101-1115 and with assigned wavelengths. The connectivity count and connectivity weight are shown as (c)cw.

Figure 12:
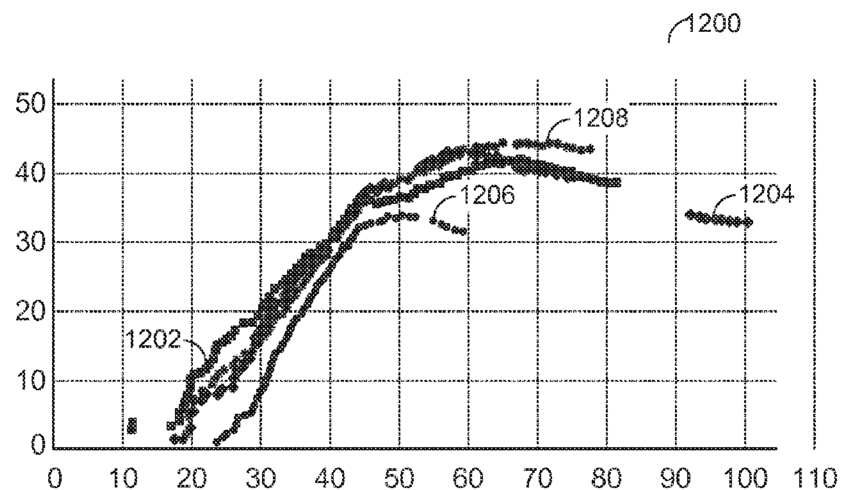
FIG. 12 illustrates an exemplary graph of MST continuity blocking probability curves for wavelength continuity in a node metro network.

FIG. 12 illustrates an exemplary realtime graph 1200 of MST continuity blocking probability curves for wavelength continuity in a node metro network. The data is as follows: SPF No Vector Difference 1202; Connectivity Weighted No Vector Difference 1204; SPF with Vector Difference MST Continuity 1206; and Connectivity Weighted with Vector Difference MST Continuity 1208.

Figure 13:
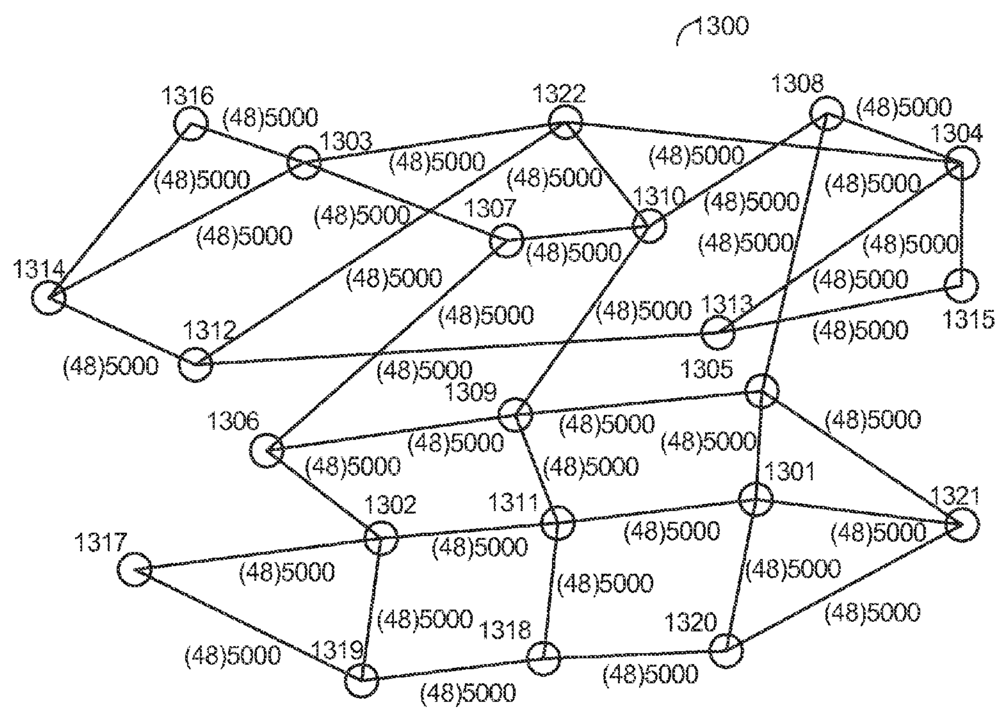
FIG. 13 illustrates an exemplary node mesh network.

FIG. 13 illustrates an exemplary node mesh network 1300 with nodes 1301-1322 and with assigned wavelengths. The connectivity count and connectivity weight are shown as (c)cw.

Figure 14:
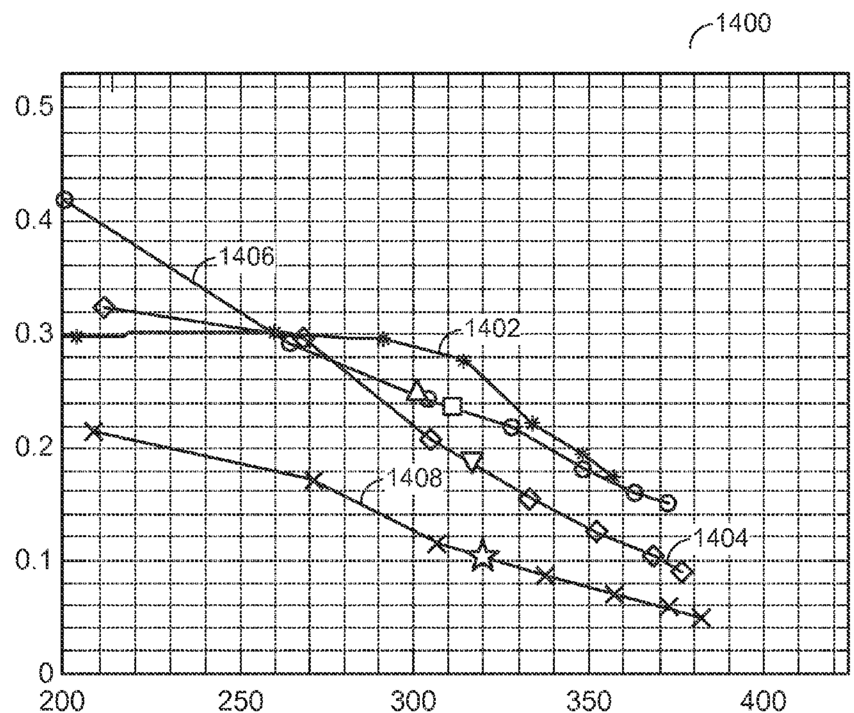
FIG. 14 illustrates an exemplary graph of a 22 node mesh $bp_{wlc}$ for uniform demand maps.

FIG. 14 illustrates an exemplary graph 1400 of a 22 node mesh $bp_{wlc}$ for uniform demand maps. In FIG. 14, wavelength continuity blocking probability is plotted against lightpath requests met. The data is as follows: SPF No Vector Difference 1402; SPF with Vector Difference MST Continuity 1404; Connectivity Weighted No Vector Difference 1406; and Connectivity Weighted with Vector Difference MST Continuity 1408.

Figure 15:
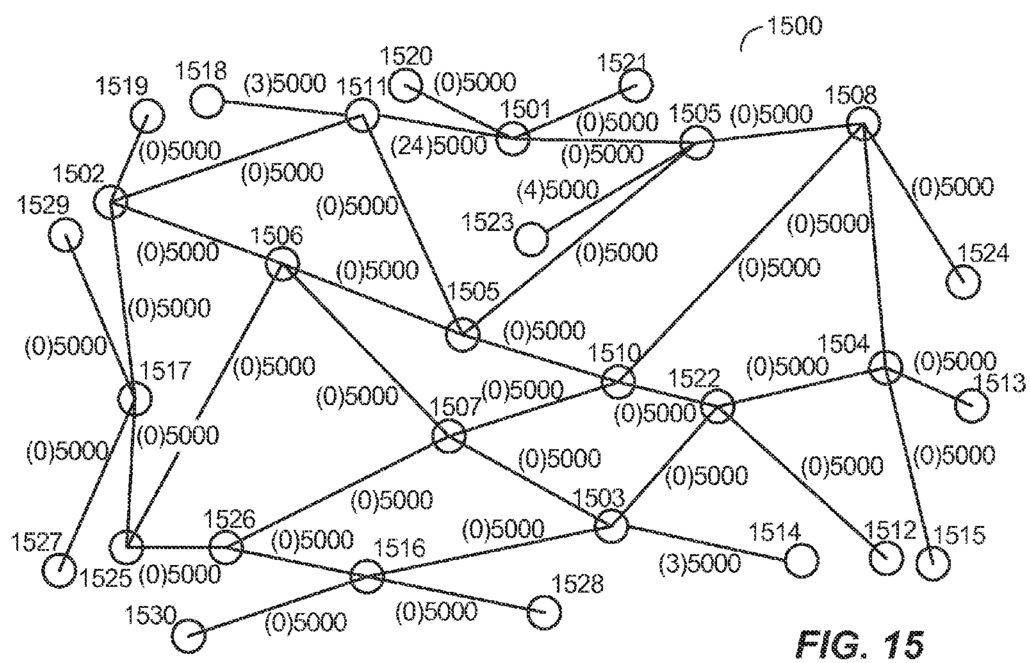
FIG. 15 illustrates an exemplary node mesh with star topologies.

FIG. 15 illustrates an exemplary node mesh with star topologies 1500 with nodes 1501-1530 with assigned wavelengths. The connectivity count and connectivity weight are shown as (c)cw.

Figure 16:
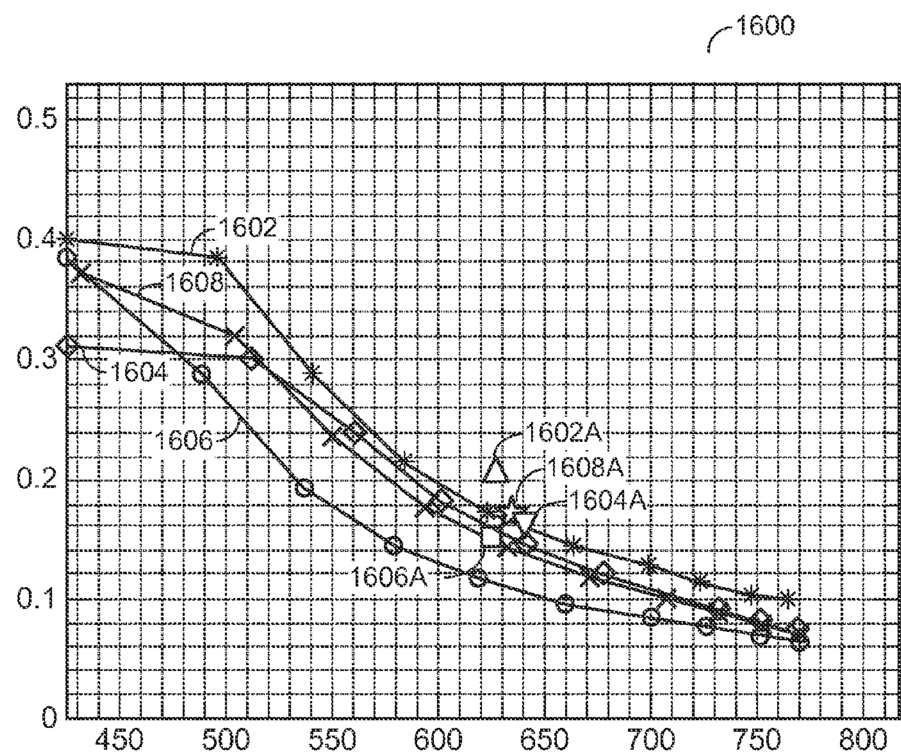
FIG. 16 illustrates an exemplary graph of a 30 node mesh $bp_{wlc}$ for uniform demand maps.

FIG. 16 illustrates an exemplary graph 1600 of a 30 node mesh $bp_{wlc}$ for uniform demand maps. The data is as follows: SPF No Vector Difference 1602 with mean 1602A; SPF with Vector Difference MST 1604 with mean 1604A; Connectivity Weight Cost Function 1606 with mean 1606A; and Connectivity Weight Cost Function with Vector Difference Wavelength Assignment 1608 with mean 1608A.

Figure 17:
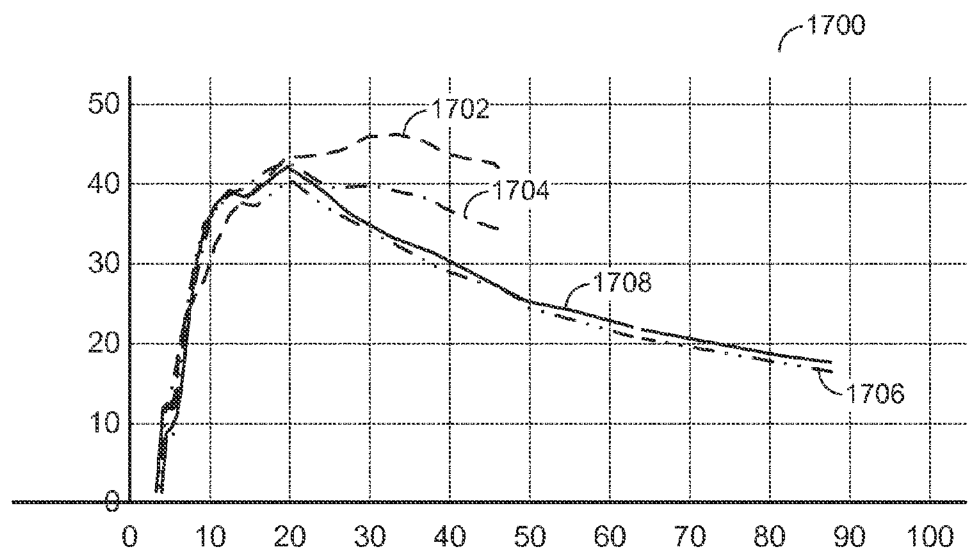
FIG. 17 illustrates an exemplary graph of MST continuity blocking probability curves for wavelength continuity in a node mesh with star topologies.

FIG. 17 illustrates an exemplary realtime graph 1700 of MST continuity blocking probability curves for wavelength continuity in a node mesh with star topologies. SPF No Vector Difference 1702; Connectivity Weighted No Vector Difference 1704; SPF with Vector Difference MST Continuity 1706; and Connectivity Weighted with Vector Difference MST Continuity 1708.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for optimizing routing and wavelength assignment in a network, the method comprising:

determining, by a source node in the network, a routing assignment for the network, wherein the routing assignment is determined using a decongestion cost-based function;

determining, by the source node, a wavelength assignment for the network based on a vector difference, wherein the vector difference uses bit operations to describe wavelength usage across links in the network based on how the links are connected, the determination of the wavelength assignment comprising spanning the network for a path, calculating a weighted correlation function for at least one length in the network, storing the weighted correlation, determining if a next path exists, if the next path is found, spanning for the next path in the network, and if the next path is not found, returning the stored correlation, and wherein the cost-based function comprises assigning a connectivity weight to each cross connect within the source node, determining a runtime hop count during route computation, and calculating an incremental and cumulative cost based route on the connectivity weight and the hop count.

2. The method of claim 1, further comprising determining at least one path for routing based on the cost-based function.

3. The method of claim 2, wherein a set of shortest length paths comprises at least one shortest length path that is longer than a second shortest length path in the set of shortest length paths.

4. The method of claim 1, further comprising:

calculating at least one vector difference in a spanning process for a wavelength vector in the network for a lightpath reservation based on wavelength continuity to avoid blocking due to node or network segmentation as part of lightpath reservations.

5. The method of claim 4, further comprising:

determining a wavelength based in part on stored calculated vector differences.

6. The method of claim 1, further comprising computing minimum spanning tree (MST) links for networks with more than 20 nodes.

7. The method of claim 1, further comprising calculating wavelength vectors for links within two level proximity for a current working path.

8. The method of claim 1, further comprising using integer linear programming.

9. The method of claim 1, wherein the network comprises a heterogeneous bandwidth composition.

10. The method of claim 1, further comprising assigning a weight with each new path found.

11. An apparatus, in a source node in a network, for optimizing routing and wavelength assignment in the network, comprising:

logic configured to determine a routing assignment for a network, wherein the routing assignment is determined using a decongestion cost-based function;

logic configured to determine a wavelength assignment for the network based on a vector difference, wherein the vector difference uses bit operations to describe wavelength usage across links in the network based on how the links are connected, the determination of the wavelength assignment comprising logic configured to span the network for a path, logic configured to calculate a weighted correlation function for at least one length in the network, logic configured to store the weighted correlation, logic for determining if a next path exists, logic configured to span for the next path in the network if the next path is found, and logic configured to return the stored correlation if the next path is not found, and wherein the cost-based function is implemented through logic configured to assign a connectivity weight to each cross connect within the source node, logic configured to determine a runtime hop count during route computation, and logic configured to calculate an incremental and cumulative cost based route on the connectivity weight and the hop count.

12. The apparatus of claim 11, further comprising:

logic configured to determine at least one path for routing based on the cost-based function.

13. The apparatus of claim 12, wherein a set of shortest length paths comprises at least one shortest length path that is longer than a second shortest length path in the set of shortest length paths.

14. The apparatus of claim 11, further comprising:

logic configured to calculate at least one vector difference for a second wavelength in the network for a lightpath reservation based on wavelength continuity to avoid blocking due to node or network segmentation as part of lightpath reservations.

15. The apparatus of claim 14, further comprising:

logic configured to determine a path based on stored calculated vector differences.

16. The apparatus of claim 11, further comprising logic configured to compute minimum spanning tree (MST) links for networks with more than 20 nodes.

17. The apparatus of claim 11, further comprising logic configured to calculate wavelength vectors for wavelengths within two level proximity for a current working path.

18. The apparatus of claim 11, further comprising logic configured to use integer linear programming.

19. The apparatus of claim 11, wherein the network comprises a heterogeneous bandwidth composition.

20. The apparatus of claim 11, further comprising logic configured to assign a weight with each new path found.

21. A network with an apparatus for optimizing routing and wavelength assignment in the network, comprising:

a plurality of nodes interconnected to one another through a plurality of wavelengths; and a processor at a source node of the plurality of nodes configured to determine a routing assignment for a network, wherein the routing assignment is determined using a decongestion cost-based function, determine a wavelength assignment for the network based on a vector difference, wherein the vector difference uses bit operations to describe wavelength usage across links in the network based on how the links are connected, and wherein for the determination of the wavelength assignment, the processor is configured to span the network for a path, calculate a weighted correlation function for at least one length in the network, store the weighted correlation, determine if a next path exists, span for the next path in the network if the next path is found, and return the stored correlation if the next path is not found, and wherein, for the cost-based function, the processor is further configured to assign a connectivity weight to each cross connect within the source node, determine a runtime hop count during route computation, and calculate an incremental and cumulative cost based route on the connectivity weight and the hop count.

22. The network of claim 21, wherein the processor is further configured to determine at least one path for routing based on the cost-based function.

23. The network of claim 22, wherein a set of shortest length paths comprises at least one shortest length path that is longer than a second shortest length path in the set of shortest length paths.

24. The network of claim 21, wherein the processor is further configured to calculate at least one vector difference for a second wavelength in the network for a lightpath reservation based on wavelength continuity to avoid blocking due to node or network segmentation as part of lightpath reservations.

25. The network of claim 24, wherein the processor is further configured to determine a path based on stored calculated vector differences.

26. The apparatus of claim 21, wherein the processor is further configured to calculate wavelength vectors for wavelengths within two level proximity for a current working path.

27. The apparatus of claim 21, wherein the processor is further configured to assign a weight with each new path found.

28. The apparatus of claim 21, wherein the processor is further configured to assign a weight with each new path found.

29. Software for optimizing routing and wavelength assignment in a network stored in a non-transitory computer-readable medium, comprising:

at least one instruction executed by one or more processors at a source node in a network to determine a routing assignment for the network, wherein the routing assignment is determined using a decongestion cost-based function;

at least one instruction executed by the one or more processors at the source node to determine a wavelength assignment for the network based on a vector difference, wherein the vector difference uses bit operations to describe wavelength usage across links in the network based on how the links are connected, the determination of the wavelength assignment comprising at least one instruction executed by the one or more processors to span the network for a path, at least one instruction executed by the one or more processors to calculate a weighted correlation function for at least one length in the network, at least one instruction executed by the one or more processors to store the weighted correlation, at least one instruction executed by the one or more processors to determine if a next path exists, at least one instruction executed by the one or more processors to span for the next path in the network if the next path is found, and at least one instruction executed by the one or more processors to return the stored correlation if the next path is not found, and wherein the cost-based function is implemented through at least one instruction executed by the one or more processors to assign a connectivity weight to each cross connect within the source node, at least one instruction executed by the one or more processors to determine a runtime hop count during route computation, and at least one instruction executed by the one or more processors to calculate an incremental and cumulative cost based route on the connectivity weight and the hop count.

* * * * *